US010434405B2

(12) United States Patent
Nelson et al.

(10) Patent No.: US 10,434,405 B2
(45) Date of Patent: Oct. 8, 2019

(54) CONTROL STICK SENSITIVITY ADJUSTMENT

(71) Applicant: Microsoft Technology Licensing, LLC, Redmond, WA (US)

(72) Inventors: Ross Anthony Nelson, Seattle, WA (US); Aaron J. Schmitz, Redmond, WA (US); Curtis F. McClive, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 123 days.

(21) Appl. No.: 15/798,167

(22) Filed: Oct. 30, 2017

(65) Prior Publication Data

US 2019/0126140 A1  May 2, 2019

(51) Int. Cl.
*A63F 13/20* (2014.01)
*A63F 13/22* (2014.01)
*A63F 13/24* (2014.01)

(52) U.S. Cl.
CPC .............. *A63F 13/22* (2014.09); *A63F 13/20* (2014.09); *A63F 13/24* (2014.09)

(58) Field of Classification Search
USPC ............................................ 463/38; 345/161
See application file for complete search history.

(56) References Cited

U.S. PATENT DOCUMENTS

| 5,877,748 A | 3/1999 | Redlich et al. |
| 5,963,195 A | 10/1999 | Gregg et al. |
| 5,963,196 A * | 10/1999 | Nishiumi ............... A63F 13/02 345/161 |
| 6,053,814 A | 4/2000 | Pchenitchnikov et al. |
| 6,086,236 A | 7/2000 | De Raad et al. |
| 6,203,432 B1 | 3/2001 | Roberts et al. |

(Continued)

FOREIGN PATENT DOCUMENTS

| CA | 2147575 A1 | 10/1996 |
| CN | 203123534 U | 8/2013 |

OTHER PUBLICATIONS

"International Search Report & Written Opinion for PCT Application No. PCT/US18/055762", dated Jan. 23, 2019, 12 Pages.

(Continued)

*Primary Examiner* — Pierre E Elisca
(74) *Attorney, Agent, or Firm* — Alleman Hall Creasman & Tuttle LLP

(57) ABSTRACT

Examples are disclosed that relate to adjusting sensitivity of a control stick. In one example, a method comprises: receiving a dead zone inflection point defining a boundary of a dead zone region and a playspace region within a normalized two-dimensional movement space, receiving a sensitivity inflection point within the playspace region of the normalized two-dimensional movement space, transforming the sensitivity inflection point to a transformed sensitivity inflection point using a sensitivity scaling function that comprises the dead zone inflection point, receiving position data representing a current position of the control stick, and transforming the current position to a transformed position using a mapping function comprising the dead zone inflection point and the transformed sensitivity inflection point.

20 Claims, 8 Drawing Sheets

(56) References Cited

U.S. PATENT DOCUMENTS

| | | | |
|---|---|---|---|
| 8,090,532 | B2 | 1/2012 | Tashev et al. |
| 8,133,119 | B2 | 3/2012 | Finocchio |
| 8,264,458 | B2 | 9/2012 | Cooper et al. |
| 8,730,166 | B2 * | 5/2014 | Larsen .................. A63F 13/214 345/161 |
| 8,762,035 | B2 | 6/2014 | Levine et al. |
| 8,979,658 | B1 | 3/2015 | Kulavik |
| 9,927,252 | B1 | 3/2018 | Chokshi et al. |
| 2004/0222965 | A1 | 11/2004 | Riccomini et al. |
| 2005/0255918 | A1 | 11/2005 | Riggs et al. |
| 2007/0188458 | A1 | 8/2007 | Bells et al. |
| 2008/0154533 | A1 | 6/2008 | Poulsen |
| 2010/0081507 | A1 | 4/2010 | Finocchio |
| 2010/0088096 | A1 | 4/2010 | Parsons |
| 2012/0282884 | A1 | 11/2012 | Sun |
| 2013/0100021 | A1 | 4/2013 | Larsen et al. |
| 2017/0252645 | A1 | 9/2017 | Mcclive et al. |
| 2017/0255279 | A1 | 9/2017 | Mcclive et al. |
| 2019/0118088 | A1 | 4/2019 | Nelson et al. |

OTHER PUBLICATIONS

"Doing Thumbstick Dead Zones Right", Retrieved From <<http://www.third-helix.com/2013/04/12/doing-thumbstick-dead-zones-right.html>>, Published on: Apr. 12, 2013, 7 Pages.

Lienhard, Samantha, "You Can Now Alter the Gta V Shooting "Deadzone"", Retrieved From <<http://www.gta5cheats.com/can-now-alter-gta-v-shooting-deadzone/>>, Published on: Dec. 19, 2014, 3 Pages.

"Get the Best Route, Every Day, With Real-Time Help From Other Drivers", Retrieved from https://www.waze.com/, Retrieved on: Jun. 29, 2018, 4 Pages.

"Nextdoor—Is the Private Social Network for Your Neighborhood", Retrieved from https://nextdoor.com/, Retrieved on: Jun. 29, 2018, 4 Pages.

"The On-Call Mobile Security App that always has your back", Retrieved from https://companionapp.io/, Retrieved on: Jun. 29, 2018, 4 Pages.

"Ultrasonic Sensor", Retrieved from: https://www.scribd.com/document/166448734/Ultrasonic-Sensor-Wikipedia-The-Free-Encyclopedia, Aug. 17, 2013, 1 Page.

"Ultrasonic Spectacles and Waist-belt for Visually Impaired and Blind people", Retrieved From http://www.sooxma.com/docs/Abstracts/SET-651,UltrasonicSpectales%20And%20Waist-belt.DOC, Retrieved Date: Sep. 29, 2017, 3 Pages.

Elmannai, et al., "Sensor-Based Assistive Devices for Visually-Impaired People: Current Status, Challenges, and Future Directions", In Journal of Sensors, vol. 17, Issue 3, Mar. 10, 2017, 42 Pages.

Gomma, Ahmed Adel., "Arduino—Project Hub", Retrieved from: https://create.arduino.cc/projecthub/ahmed-adel-gomaa/isbbm-integrated-smart-belt-for-blind-s-mobility-a09c5e, Mar. 30, 2015, 18 Pages.

Hossain, et al., "Design and data analysis for a belt-for-blind for visual impaired people", In International Journal of Advanced Mechatronic Systems, vol. 3, No. 5-6, Jan. 1, 2011, pp. 384-397.

Lavanya, et al., "Hand Gesture Recognition and Voice Conversion System Using Sign Language Transcription System", In International Journal of Electronics & Communication Technology, vol. 5, Issue 4, Oct. 2014, 145-150.

Lumb, David, "These Students Built a Glove That Translates Sign Language into English", Retrieved from: https://www.fastcompany.com/3059616/these-students-built-a-glove-that-translates-sign-language-into-english, May 8, 2016, 13 Pages.

"International Search Report and Written Opinion Issued in PCT Application No. PCT/US2017/019798", dated Oct. 19, 2017, 21 Pages.

"International Search Report and Written Opinion Issued in PCT Application No. PCT/US2018/055769", dated Dec. 14, 2018, 10 Pages.

Raushan, et al., "Sign Language Detection for Deaf and Dumb Using Flex Sensors", In International Research Journal of Engineering and Technology, vol. 04, Issue 03, Mar. 2017, pp. 1023-1025.

Revell, Timothy, "Glove turns sign language into text for real-time translation", Retrieved from: https://www.newscientist.com/article/2140592-glove-turns-sign-language-into-text-for-real-time-translation/, Jul. 12, 2017, 3 Pages.

Venkateshwar, et al., "Intelligent Belt for the Blind", In International Journal of Scientific & Engineering Research, vol. 3, Issue 11, Nov. 2012, 1-3.

Whitwam, Ryan, "Google Maps Adds Real Time Incident Reporting Courtesy of Waze", Retrieved from https://www.androidpolice.com/2013/08/20/google-maps-adds-real-time-incident-reporting-courtesy-of-waze/, Aug. 20, 2013, 4 Pages.

Dicianno, B. et al., "Joystick Control for Powered Mobility: Current State of Technology and Future Directions," In Journal of Physical Medicine and Rehabilitation Clinics of North America, vol. 21, Issue 1, Feb. 21, 2010, 8 pages.

"Non Final Office Action Issued in U.S. Appl. No. 15/887,924", dated Mar. 29, 2019, 15 Pages.

"Non Final Office Action Issued in U.S. Appl. No. 15/793,614", dated Jun. 12, 2019, 9 Pages.

* cited by examiner

CONTROL STICK SENSITIVITY ADJUSTMENT

BACKGROUND

User input devices may be used to provide input to computing devices. Some user input devices utilize one or more control sticks that include mechanical and electrical components to generate position values in one or more directional axes. Some systems employ a central dead zone in which the position of the control stick is ignored.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to devices and methods for adjusting the sensitivity of a control stick. In one example, a method comprises: receiving a dead zone inflection point defining a boundary of a dead zone region and a playspace region within a normalized two-dimensional movement space of the control stick, receiving a sensitivity inflection point within the playspace region of the normalized two-dimensional movement space, transforming the sensitivity inflection point to a transformed sensitivity inflection point using a sensitivity scaling function that comprises the dead zone inflection point, receiving position data representing a current position of the control stick, and transforming the current position to a transformed position in the normalized two-dimensional movement space using a mapping function comprising the dead zone inflection point and the transformed sensitivity inflection point.

DETAILED DESCRIPTION

User input devices that include one or more control sticks may be used to provide input to a variety of devices, such as video game consoles, vehicles and other machines (robots, unmanned aircraft (e.g., drones), etc.). The control sticks typically include mechanical and electrical components to generate position values in one or more directional axes. In some systems, a central dead zone may be employed in the coordinate space of position values. When the control stick is located in the dead zone, the position of the control stick is ignored. In some examples, the position values of the control stick reported by the device may be adjusted to compensate for a dead zone or another sensitivity region in the coordinate space.

Figure 1:
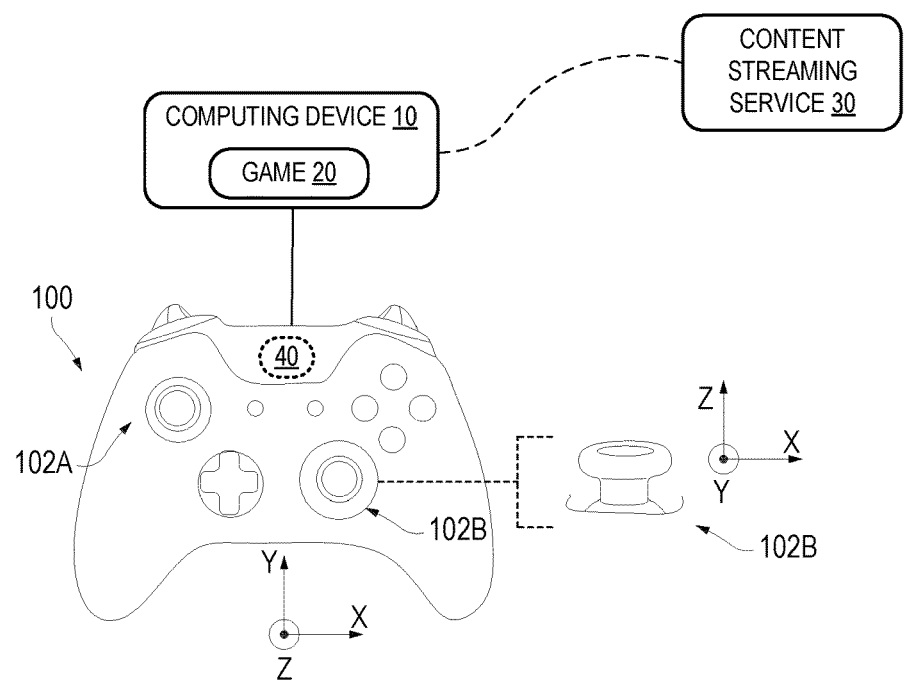
FIG. 1 shows an example of a user input device including a plurality of control sticks according to examples of the present disclosure.

With reference now to FIG. 1, in one example a user may provide input to a computing device 10, such as a gaming console, smart TV or the like, through a user input device in the form of a controller 100. The controller 100 may comprise a plurality of user-actuatable input components by which a user may interact with, for example, a video game 20 or other application or content executing on or provided by the computing device 10, or provided by a remote content streaming service 30.

In some examples, the controller 100 may include one or more control sticks in the form of a left thumbstick 102A and/or a right thumbstick 102B. Each of the thumbsticks 102A, 102B is a user-actuatable input component that may be manipulated by a user's thumb (or other digit) along two or more axes for controlling or otherwise interacting with a machine, computing device, computer program such as a video game or other application, etc.

In some examples, each of the thumbsticks 102A and 102B may interact with control-activation sensors in the form of potentiometers. The potentiometers use continuous electrical activity to provide an analog input control signal based on a position of the thumbstick relative to a default position. Other examples of control-activation sensors may include dome switches, tactile switches, Hall effect and other magnetic sensors, capacitive sensors, optical sensors, and other electronic sensing components.

The controller 100 may be communicatively coupled to computing device 10 via a wired or wireless connection. As described in more detail below, the sensitivity of a control stick of controller 100 may be adjusted by modifying control signals generated by the control stick. In some examples and as described below, such modifications may be performed by computing device 10. For example, computing device 10 may comprise a processor and a memory device storing instructions executable by the processor to adjust the sensitivity of a control stick as described herein. In other examples, such modifications may be performed locally on a computing device 40 integrated into controller 100. Additional details regarding the components and computing aspects of computing device 10 and computing device 40 are described in more detail below with reference to FIG. 9.

It will be appreciated that the video game controller 100 and user-actuatable input components described above are merely examples provided for illustrative purposes. In other examples, other user input devices comprising different types and/or combinations of control sticks and other user-actuatable input components may be utilized.

Figure 2:
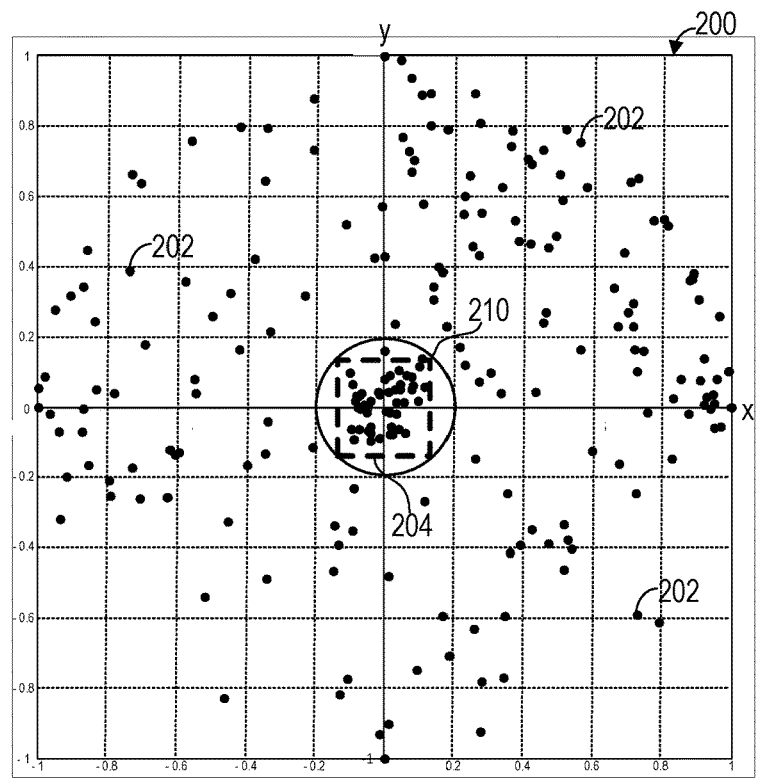
FIG. 2 shows an example plot of positions of a control stick according to examples of the present disclosure.

With reference now to FIG. 2, in some examples control stick mechanisms may have limited precision and repeatability. For example and with reference to thumbstick 102B of FIG. 1, when a user is not engaging the thumbstick, the thumbstick may return to a central resting position by means of springs, bands, motors, servos or other suitable return elements. The resting position can vary over time within a device, or may vary from device-to-device depending upon manufacturing variability, component variation, wear of components, and other factors.

In the example of FIG. 2, a current position of thumbstick 102B may be reported as a pair of coordinates represented by a point 202. In FIG. 2, the current position of thumbstick 102B is sampled at a time interval (e.g. every 10 ms) for a short period (e.g. 10 seconds). Each sampled position is plotted as a point 202 within a two-dimensional coordinate space 200. In the example of FIG. 2, the two-dimensional coordinate space 200 is normalized to have a maximum absolute value of 1 along either axis. In this manner, the thumbstick will report positions on the range from −1.00 to 1.00, where 0.00 is the ideal center position. Valid positions may occur on increments of a predetermined size or range, such as 0.05. In the example of FIG. 1, a position of thumbstick 102B along the x-axis corresponds to a coordinate on the x-axis in coordinate space 200, and a position of thumbstick 102B along the y-axis corresponds to a coordinate on the y-axis in coordinate space 200.

In operation and when released, thumbstick 102B may return to a location that does not exactly match the ideal center position when it is not engaged by a user. A distribution of these different return locations may define a return-to-center region within which the thumbstick 102B will likely settle when released. The distribution of different return locations and the size and shape of the corresponding return-to-center region may vary from one user input device to another. FIG. 2 shows one example of a return-to-center region 204 in the shape of a square. In different examples, other sizes and shapes of return-to-center regions may be defined.

The distribution of different return locations in a return-to-center region can make it difficult for a system to determine whether the thumbstick 102B is idle or not (e.g., whether or not a user is deflecting the thumbstick). In one example, a video game may address this issue by defining a "dead zone" within the coordinate space 200. By implementing a dead zone, any position of the thumbstick 102B within the dead zone is considered idle. The position of the thumbstick 102B is only recognized as user input by the game once the thumbstick 102B exits the dead zone. With reference again to FIG. 2, one example of a circular dead zone region 210 centered at (0,0) is illustrated. In other examples, dead zone regions may have a variety of shapes and sizes.

Dead zone implementations may vary significantly among different games and other applications and devices receiving thumbstick input. For example, the size and shape of a dead zone region may vary from one game to another. A video game may implement the dead zone in the game's software, and the game may support only a single dead zone region (size and shape). However and as noted above, the distribution of different return locations and corresponding return-to-center regions can vary from one user input device to another. This, in turn, can lead to a mismatch between a particular dead zone region and the return-to-center region of a given device.

Such mismatches between a dead zone and a return-to-center region may result in errors in the performance of the user input device, computing device and/or software executed on the computing device. In some examples and to partially address these issues, the dead zone of a video game or other application or device may be designed larger than the anticipated return-to-center regions of input devices with which it may be used. In this way, for example, a video game may attempt to ensure that its dead zone will encompass the return-to-center regions of a variety of controllers with which it may be used.

However, a dead zone region larger than a return-to-center region of an input device produces a sensitivity problem for the user. For example and with reference to FIG. 1, a user must deflect thumbstick 102B a certain distance from the center to outside the dead zone before any response is registered by the game. This lack of immediate response can impair the user's gameplay performance, especially when a small in-game response is desired or the dead zone is large.

On the other hand, a dead zone that is smaller than a return-to-center region is also undesirable. For example, if thumbstick 102B comes to rest at a position outside the dead zone, the game will respond as if the user deflected the thumbstick, even if the thumbstick is idle. This results in the user experiencing a game response when none was expected.

In some examples, a system may address problems associated with mismatches between the dead zone and the return-to-center region by mathematically transforming the coordinate space 200 based on the dead zone, and reporting the current position of the control stick in the transformed coordinate space. In some examples, a mapping function for each axis of movement of the control stick may be utilized. In other words, a mapping function for the x-axis position and a mapping function for the y-axis position of the control stick may be utilized. In different examples the two mapping functions may be the same or different functions. In this manner, a transformed position along each axis of control stick movement may be provided.

Figure 3:
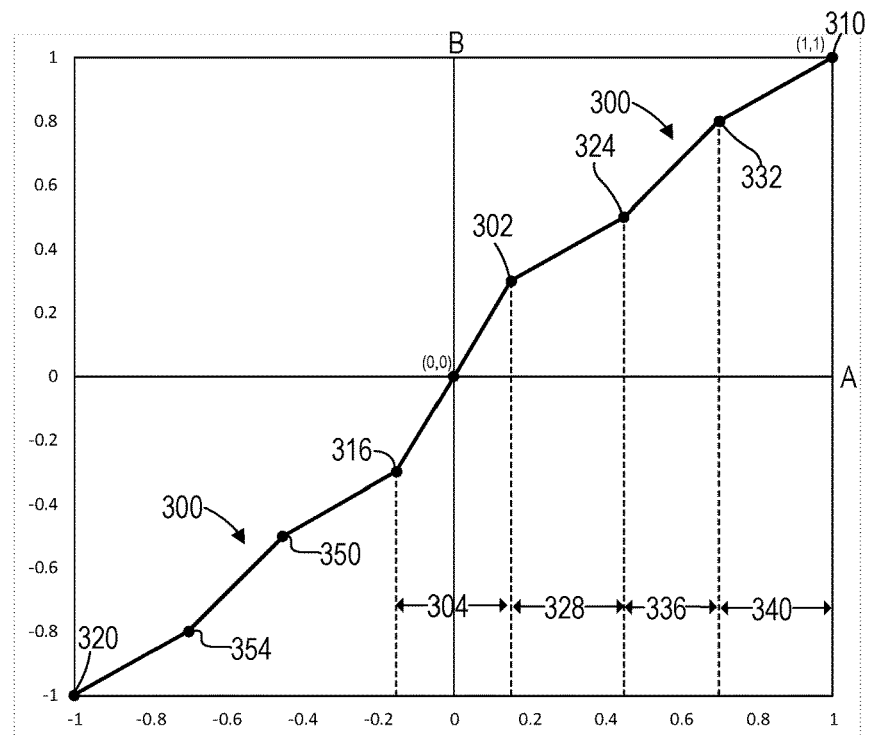
FIG. 3 shows an example plot of a mapping function for one axis of movement comprising a dead zone inflection point and a plurality of sensitivity inflection points.

FIG. 3 shows one example of a mapping function that may be applied to positions of a control stick along one axis of movement of the control stick. In the example of FIG. 3, the mapping function 300 is plotted as a piecewise linear function on an A-axis and a B-axis within a normalized movement space of thumbstick 102B. A coordinate of the current position of thumbstick 102B along one axis of control stick movement, such as the x-axis, may be received as an input variable on the A-axis of the mapping function 300. The mapping function 300 then outputs a transformed position along the B-axis, which corresponds to a transformed position along the x-axis of movement in the normalized two-dimensional movement space. In some examples, mapping function 300 also may be used to transform positions of thumbstick 102B along the y-axis.

The mapping function 300 illustrated in FIG. 3 comprises a first dead zone inflection point 302 and a second dead zone inflection point 316. The A-axis coordinate of the first dead zone inflection point 302 may be a position along a given axis of movement of the thumbstick 102B, such as the x-axis, that represents an outer edge of the return-to-center region of the thumbstick in the positive direction of the thumbstick. The B-axis coordinate of the first dead zone inflection point 302 may be a position along the same axis of movement that represents the edge of a game's dead zone region in the positive direction. Thus, at the first dead zone inflection point 302, the mapping function 300 transforms a position coordinate of thumbstick 102B at the edge of the thumbstick's return-to-center region to correspond to the edge of the game's dead zone region.

In the example of FIG. 3, the coordinates of the first dead zone inflection point 302 are (0.15, 0.3). In this manner and for example, when the thumbstick 102B is at an x-axis position of 0.15, this position is transformed and reported as 0.3 in the normalized two-dimensional movement space of the control stick. Accordingly and as described in more detail below, the first dead zone inflection point 302 defines a boundary of a dead zone region and a playspace region within a normalized two-dimensional movement space of the control stick.

In a similar manner, the second dead zone inflection point 316 may be a position along the same x-axis of movement of the thumbstick 102B that represents an outer edge of the return-to-center region of the thumbstick in the negative direction of the thumbstick. In the example of FIG. 3, the coordinates of the second dead zone inflection point 316 are (−0.15, −0.3). Accordingly and in this example, the first dead zone inflection point 302 is reflected across the origin to provide the second dead zone inflection point 316, and thereby provide a corresponding output of the mapping function 300 for negative input coordinates.

In some examples, one or more coordinates of a dead zone inflection point may be received from an application that receives input from the control stick. For example and as noted above, a video game may store one or more predetermined dead zones. The video game may provide parameters of a dead zone, such as coordinates of a dead zone inflection point, to a computing device that is executing the game and receiving user input from a control stick of a game controller.

In some examples, one or more coordinates of a dead zone inflection point may be set based on a calibration application or process performed by a user of the controller. For example, a user may run a process to choose the transformation that best matches the topology of a game's dead zone. The coordinates of a dead zone inflection point may be set to (N, N), where N is larger than the dead zone. With the control stick idle, if a response to the position of the control stick is detected, the first coordinate of the dead zone inflection point may be increased until no response is detected. Next, the first coordinate of the dead zone inflection point may be reduced while the control stick remains idle until a response is detected. Then, both coordinates of the dead zone inflection point may be scaled by multiplication with a scaling factor F. F is initially set to 1.0 and is incrementally reduced until no response is detected to the idle control stick.

In some examples, one or more coordinates of a dead zone inflection point may be updated during a runtime calibration process. With some user input devices, the distribution of points where the control stick comes to rest may change during operation due to, for example, mechanical variation of the control stick mechanism. To address such variations, the return to center region may comprise an adaptive size that may be updated as the control stick is in use. The motion of the control stick may be sampled while the control stick is in use to update a group of resting points that comprise the return to center region, or to establish a new distribution of resting points. In this manner, coordinates of the dead zone inflection point, such as the size of the return-to-center region, may be updated to more closely match changes in the control stick mechanism over time.

In some examples, receiving one or more coordinates of a dead zone inflection point may include receiving parameters as game behavior changes to ensure that control stick behavior is optimized for the current settings. For example, when an aspect of a video game changes, such as when a user advances to a new level of play, a video game console may send an updated dead zone shape and size to the controller and/or associated computing device.

In some examples, one or more return-to-center parameters of a control stick may be determined during a manufacturing process for the control stick and may be stored in the corresponding user input device. In this manner, the stored parameter(s) may be utilized to determine a mapping function as described above. For example, a dead zone inflection point may be based at least in part on a stored return-to-center region comprising a coordinate representing the outer boundary of the return-to-center region of the control stick. In this manner, a stored return-to-center region may be used to inform the firmware of a gaming console of the individual controller's hardware characteristics.

With reference again to FIG. 3, the mapping function 300 comprises a continuous sub-function from the origin to the first dead zone inflection point 302 and to the second dead zone inflection point 316. In this example, the first dead zone inflection point 302 and second dead zone inflection point 316 define the boundaries of a dead zone region 304 along one axis of movement of a control stick. Within the dead zone region 304, position values of the control stick are transformed to fit within the game's dead zone. As explained above, any position values falling between the first dead zone inflection point 302 and the second dead zone inflection point 316 are ignored or not recognized by the game or other application implementing the dead zone region 304.

The area outside of the dead zone region 304, referred to herein as the playspace region, is the area in which the position of the control stick is recognized by and/or elicits a response from the game or other application. In the example of FIG. 3, the playspace region comprises the segments of the mapping function 300 between first dead zone inflection point 302 and a maximum point 310, and between the second dead zone inflection point 316 and a minimum point 320.

The mapping function 300 also may comprise one or more additional sensitivity inflection points within the playspace region. By adding a sensitivity inflection point, a user may customize and control the sensitivity of a control stick outside of the dead zone region. A sensitivity inflection point establishes and bounds a sensitivity region. The sensitivity region is defined by a continuous sub-function that links the sensitivity inflection point to another sensitivity inflection point, a dead zone inflection point, or a maximum/minimum point.

In the example of FIG. 3, a first sensitivity inflection point 324 defines a first sensitivity region 328 bounded by the first dead zone inflection point 302. A second sensitivity inflection point 332 defines a second sensitivity region 336 adjacent to the first sensitivity region 328 and bounded by the first sensitivity inflection point 324. The second sensitivity inflection point 332 also defines a third sensitivity region 340 adjacent to the second sensitivity region 336 and bounded by the maximum point 310.

Additionally and in this example, a third sensitivity inflection point 350 and fourth sensitivity inflection point 354 are provided in the negative playspace region between second dead zone inflection point 316 and minimum point 320. The third sensitivity inflection point 350 and fourth sensitivity inflection point 354 are 180 degree rotations about (0,0) of the first sensitivity inflection point 324 and second sensitivity inflection point 332, respectively, and establish corresponding sensitivity regions in this portion of the playspace. It also will be appreciated that in other examples of mapping functions, one, three, or more sensitivity inflection points may be received and utilized.

In some examples, one or more sensitivity inflection points may be received via user input. For example, a gaming console may display a mapping function that contains only the endpoints. A user may then add one or more sensitivity inflection points to the mapping function. As described in more detail below, these sensitivity inflection points may then be transformed to map into the playspace area of the mapping function.

With reference again to FIG. 3, the mapping function 300 is bounded by the maximum point 310 that represents the maximum magnitude of the position of thumbstick 102B in a positive direction on a given axis. Similarly, the mapping function 300 is bounded by the minimum point 320 that represents the maximum magnitude of the position of thumbstick 102B in a negative direction on the axis.

A general expression of mapping function 300 may be described as follows: let A be the input variable and B the output value, and consider an ordered set of inflection points $P=\{P_1, P_2, \ldots, P_n\}$. One or more sub-functions F are defined to interpolate between the points.

Thus, a general expression of mapping function 300 may be defined as follows. For simplicity, all points P and Q are referred to in this example by their A-axis coordinate:

$$B = \begin{cases} F(A, Q_1, P_1), & Q_{1A} \le A < P_{1A} \\ F(A, P_1, P_2), & P_{1A} \le A < P_{2A} \\ F(A, P_2, -P_{dz}), & P_{2A} \le A < -P_{dzA} \\ F(A, -P_{dz}, Q_2), & -P_{dzA} \le A < Q_{2A} \\ F(A, Q_2, P_{dz}), & Q_{2A} \le A < P_{dzA} \\ F(A, P_{dz}, P_3), & P_{dzA} \le A < P_{3A} \\ F(A, P_3, P_4), & P_{3A} \le A < P_{4A} \\ F(A, P_4, Q_3), & P_{4A} \le A \le Q_{3A} \end{cases}$$

where $Q_1=(Q_{1A},Q_{1B})$=minimum point 320,
$Q_2=(Q_{2A},Q_{2B})$=(0,0),
$Q_3=(Q_{3A},Q_{3B})$=maximum point 310,
$-P_{dz}=-(P_{dzA},P_{dzB})$=dead zone inflection point 316,
$P_{dz}=(P_{dzA},P_{dzB})$=dead zone inflection point 302, and
$P_1=(P_{1A},P_{1B})$, $P_2=(P_{2A},P_{2B})$, $P_3=(P_{3A},P_{3B})$, $P_4=(P_{4A},P_{4B})$=four sensitivity inflection points P.

With reference again to FIG. 3, the sub-functions defining the dead zone region 304 and other sensitivity regions 328, 336 and 340 each have a slope that defines the sensitivity of the thumbstick 102B within that region. For example, the dead zone region 304 has a slope greater than 1.0. In this region, a narrow range of input values, from −0.15 to 0.15, is transformed into a larger range of output values, from −0.3 to 0.3. This has the effect of moving the user outside of the dead zone region 304 and into the playspace region with less displacement of the thumbstick 102B than if the input values were left untransformed.

Figure 4:
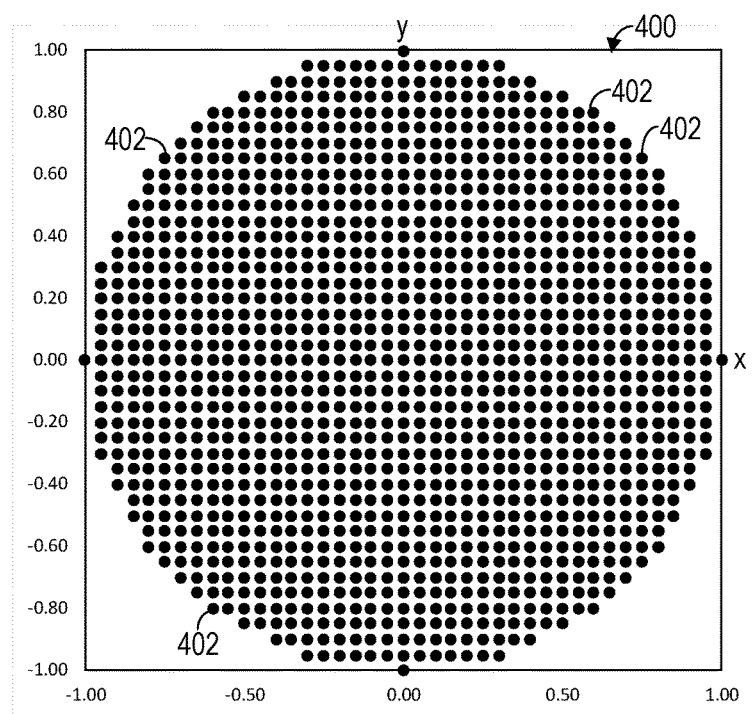
FIG. 4 shows an example plot of possible positions reported by a control stick along two axes of movement prior to transformation by the mapping function of FIG. 3.

FIG. 4 illustrates one example of all possible positions 402 reported by thumbstick 102B within a normalized two-dimensional coordinate space 400. In some examples, positions have a fixed resolution or step size between possible positions. In this example, the thumbstick 102B reports positions along each axis on the range from −1.00 to 1.00, where 0.00 is the center idle position, and valid positions occur on increments of 0.05.

Figure 5:
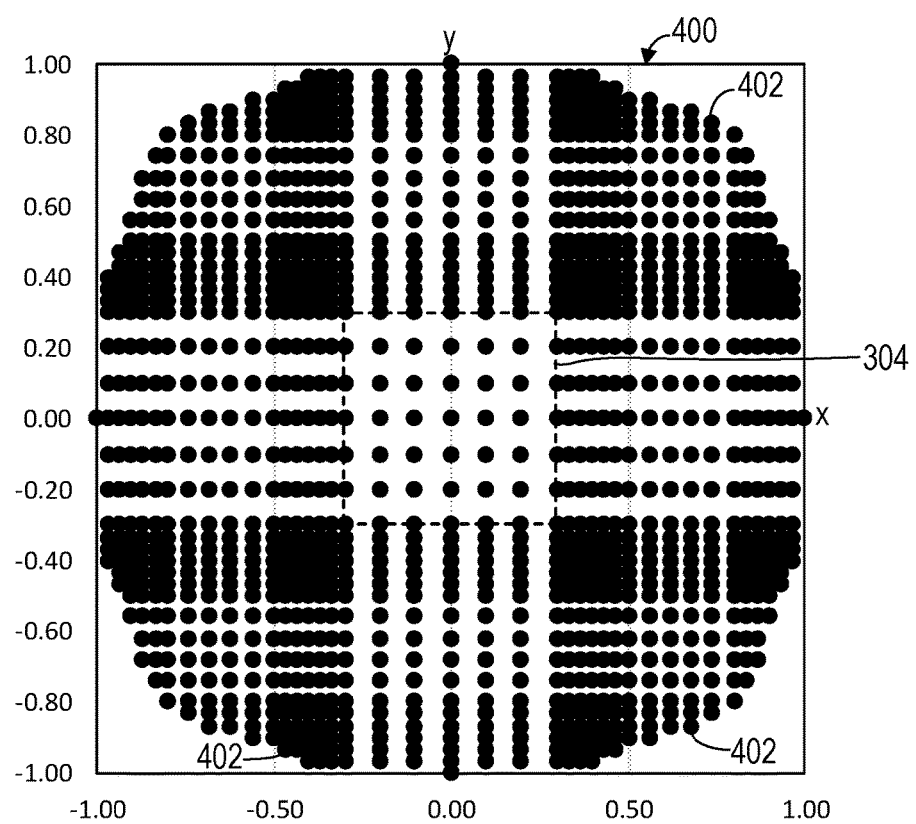
FIG. 5 shows an example plot of the possible positions of a control stick along two axes of movement transformed by the mapping function of FIG. 3 according to examples of the present disclosure.

FIG. 5 illustrates an example of the normalized coordinate space 400 of FIG. 4 in which the possible positions 402 are plotted after they have been transformed by applying the mapping function 300 from FIG. 3 to each axis independently. For example, the steeper slope of the mapping function 300 within the dead zone region 304 manifests as wider spacing between positions 402 within the dead zone region 304 (indicated by a dashed line box) from −0.3 to 0.3 along each axis in FIG. 5.

With reference again to FIG. 3, first sensitivity region 328 has a slope of less than 1.0. In this region, a broader range of input values on the A-axis, from 0.15 to 0.45, are condensed into a narrower range of output values on the B-axis, from 0.30 to 0.50. In this manner, a user would experience the first sensitivity region 328 as a region of greater precision than normal (i.e. where normal is a slope of 1.0), and a large displacement of the thumbstick 102B will result in a smaller, more precise movement reported to the game. With reference again to FIG. 5, the gentler slope of the mapping function 300 within first sensitivity region 328 manifests as tighter spacing between points 402 with coordinates in this region.

The second sensitivity region 336 has a slope greater than 1.0. In this region, a narrower range of input values on the A-axis, from 0.45 to 0.70, are expanded into a broader range of output values on the B-axis, from 0.50 to 0.80. In this manner, a user would experience the second sensitivity region 336 as a region of amplified movement, and a smaller displacement of the thumbstick 102B will result in a larger movement reported to the game. With reference to FIG. 5, the steeper slope of the mapping function 300 within second sensitivity region 336 manifests as wider spacing between points 402 with coordinates in this region.

FIG. 5 illustrates an axis-independent application of mapping function 300. In other examples, other types of transformations also may be used including, but not limited to, transformations based on radial coordinates. An example of applying mapping function 300 to a radial coordinate space may scale each two-dimensional position of thumbstick 102B along the vector it defines within the coordinate space. The magnitude of the vector may be scaled by a piecewise linear function of the vector's magnitude. One example of a generalized radial mapping function may be as follows:

Let $Q_1=(Q_{1A},Q_{1B})$=(0,0),
$Q_2=(Q_{2A},Q_{2B})$=maximum point 310,
$P_{dz}=(P_{dzA},P_{dzB})$=dead zone inflection point 302,
$R_{in}$=the unsealed magnitude of the radial vector,
$R_{out}$=the scaled magnitude of the radial vector output by F,
$P_1=(P_{1A},P_{1B})$ and $P_2=(P_{2A},P_{2B})$ are two sensitivity inflection points. For simplicity, all points P and Q are referred to in this example by their A-axis coordinate:

$$R_{out} = \begin{cases} F(R_{in}, Q_1, P_{dz}), & Q_{1A} \le R_{in} < P_{dzA} \\ F(R_{in}, P_{dz}, P_1), & P_{dzA} \le R_{in} < P_{1A} \\ F(R_{in}, P_1, P_2), & P_{1A} \le R_{in} < P_{2A} \\ F(R_{in}, P_2, Q_2), & P_{2A} \le R_{in} \le Q_{2A} \end{cases}$$

Note that the formula above is the same piecewise function as mapping function 300, although it has been simplified with the assumption that all radii are positive.

In some examples, the return-to-center region of thumbstick 102B may change or grow over time as thumbstick 102B wears, a user of the video game controller 100 may wish to switch to a different controller with a different return-to-center region, and/or a user of the video game controller 100 may wish to switch to a new video game with a different dead zone size or shape. Any of these changes may result in changing the position of the dead zone inflection point.

However, changing the location of the dead zone inflection point alone will affect the topology of the sensitivity regions outside the dead zone region. This, in turn, will cause the responsiveness of the controller to deviate from the user's desired sensitivity settings. For example and with reference again to FIG. 3, changing the location of the dead zone inflection point 302 alone will change the slope of the mapping function 300 in the first sensitivity region 328 adjacent to the dead zone region 304.

To address this issue, and to preserve the proportionality and relative topology of the sensitivity region(s) of a mapping function when the dead zone region is changed, the sensitivity inflection points of the mapping function may be transformed using a sensitivity scaling function that comprises the dead zone inflection point. An example of a sensitivity scaling function that may transform the sensitivity inflection points is:

$$P_{out} = \left(\frac{Q - P_{dz}}{Q} * P_{in}\right) + P_{dz},$$

where all operations of this function are to be performed element-wise on each element of a point, such that, for example, the product of a point (A,B) and point (C,D) is (A*C, B*D). In the above sensitivity scaling function:
$P_{dz}$=dead zone inflection point,
$P_{in}$=the input/original sensitivity inflection point,
$P_{out}$=the transformed sensitivity inflection point,
and Q=maximum point.

The first term of the sensitivity scaling function shown above, $$\left(\frac{Q - P_{dz}}{Q}\right),$$

expresses the size of the playspace as a fraction of the domain of the mapping function. Thus, $$\left(\frac{Q - P_{dz}}{Q} * P_{in}\right)$$

is the input sensitivity inflection point scaled to the playspace domain rather than the entire domain of mapping function that includes both the playspace and dead zone region. Adding $P_{dz}$ yields the transformed sensitivity inflection points by including the dead zone region in the coordinate system.

In one example, a user may desire to divide the playspace of a video game controller into three sensitivity regions. For example, the user may desire a playspace having a relatively lower sensitivity in a first sensitivity region, a relatively higher sensitivity in a second sensitivity region, and a relatively lower sensitivity in a third sensitivity region. The user may specify the following first sensitivity inflection point and second sensitivity inflection point in a playspace with an input domain from 0 to 1:
First sensitivity inflection point=$P_{s1}$=(0.33, 0.20)
Second sensitivity inflection point=$P_{s2}$=(0.67, 0.85)

Figure 6:
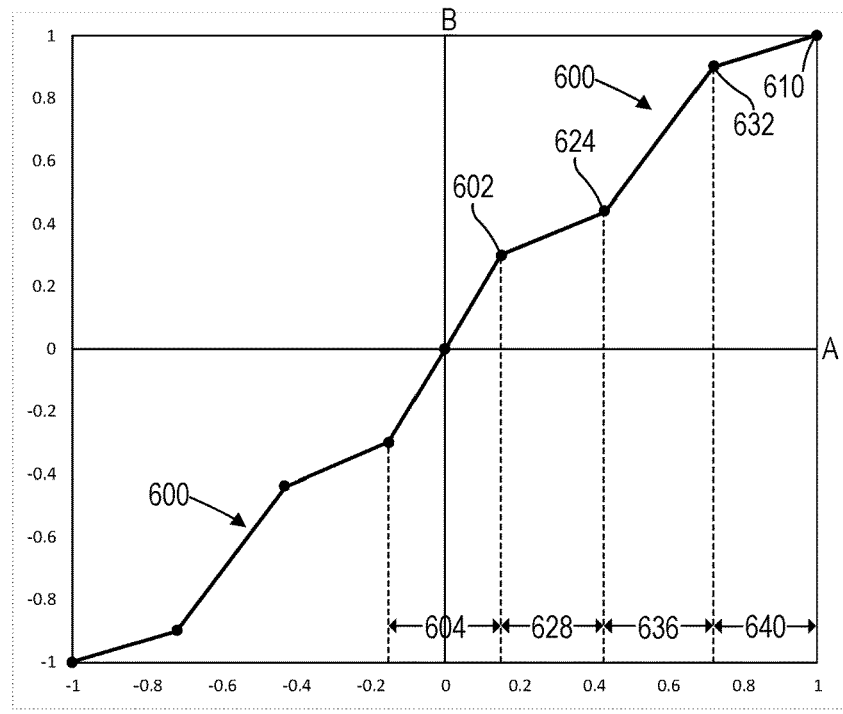
FIG. 6 shows an example plot of another mapping function according to examples of the present disclosure.

In this example, the dead zone inflection point is (0.15, 0.3). Using the above-described sensitivity scaling function that comprises the dead zone inflection point (0.15, 0.3), the user-specified sensitivity inflection points $P_{s1}$ and $P_{s2}$ may be transformed to produce the mapping function 600 illustrated in FIG. 6. With reference to FIG. 6, $P_{s1}$ is transformed to transformed first sensitivity inflection point $P_{t1}$ (indicated at 624), and $P_{s2}$ is transformed to transformed second sensitivity inflection point $P_{t2}$ (indicated at 632). The coordinates of the transformed sensitivity inflection points are as follows:
$P_{t1}$=(0.43, 0.44)
$P_{t2}$=(0.72, 0.90)

As illustrated in FIG. 6, the resulting mapping function 600 provides a relatively lower sensitivity in the first sensitivity region 628, a relatively higher sensitivity in the second sensitivity region 636 and a relatively lower sensitivity in the third sensitivity region 640.

With continued reference to the example of FIG. 6, in one example the user may switch to a controller that has a wider return-to-center region that corresponds to position 0.4 along the A-axis. As a result, the initial dead zone inflection point 602 is updated and moved along the A-axis from coordinates (0.15, 0.3) to (0.4, 0.3). Along with this updated dead zone inflection point (0.4, 0.03) (indicated at 702 FIG. 7), the user also desires to maintain the proportionality and general topology of the sensitivity regions of the playspace provided by the mapping function 600 of FIG. 6.

Figure 7:
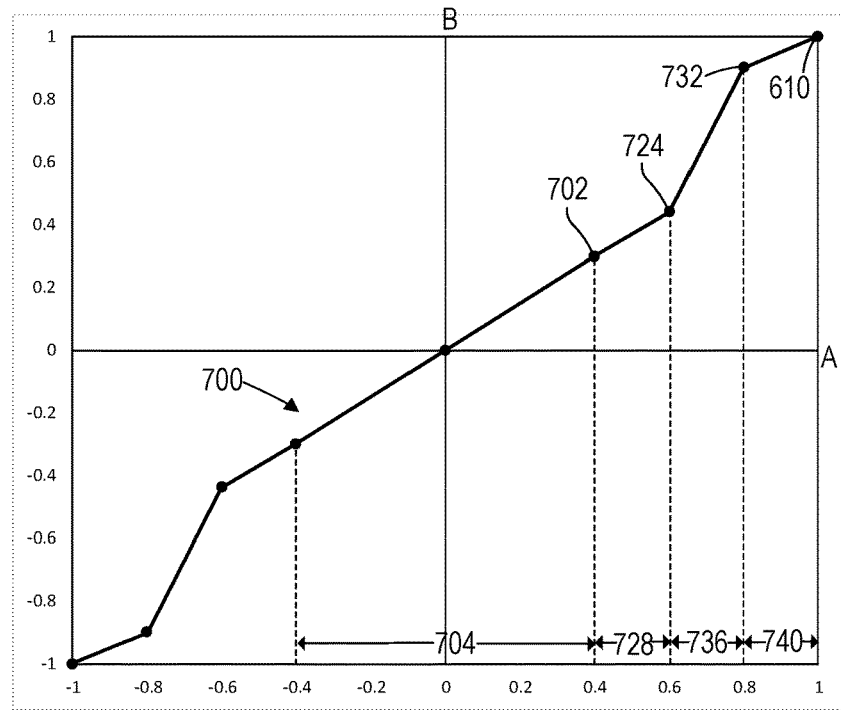
FIG. 7 shows an example plot of another mapping function in which the dead zone inflection point of FIG. 6 is changed and the sensitivity inflection points are transformed according to examples of the present disclosure.

Accordingly, and by using the sensitivity scaling function described above with the updated dead zone inflection point 702 and the existing user-specified sensitivity inflection points $P_{s1}$ and $P_{s2}$, the user-specified sensitivity inflection points may be transformed into updated transformed sensitivity inflection points that form an updated mapping function 700 shown in FIG. 7. More particularly, in this example the sensitivity scaling function yields coordinates for an updated transformed first sensitivity inflection point $P_{t1}$ (indicated at 724) and an updated transformed second sensitivity inflection point $P_{t2}$ (indicated at 732) as follows:
$P_{t1}$=(0.60, 0.44)
$P_{t2}$=(0.80, 0.90)

As shown in FIG. 7, the updated mapping function 700 comprises the updated dead zone inflection point 702, the updated transformed first sensitivity inflection point $P_{t1}$ (indicated at 724) and updated transformed second sensitivity inflection points $P_{t2}$ (indicated at 732). The updated transformed first sensitivity inflection point 724 defines an updated first sensitivity region 728 bounded by the updated dead zone inflection point 702, and defines an updated second sensitivity region 736 adjacent to the updated first sensitivity region 728. The updated transformed second sensitivity inflection point 732 also defines an updated third sensitivity region 740 adjacent to the updated second sensitivity region 736 and bounded by the maximum point 610.

In this example, the updated dead zone inflection point 702 delivers a 267% increase in the updated dead zone region 704 as compared to the initial dead zone region 604 (from 0.15 to 0.4). Additionally and advantageously, using the sensitivity scaling function results in an updated mapping function 700 that retains the proportionality and general topology of the playspace and sensitivity regions in mapping function 600 of FIG. 6. More particularly and like mapping function 600, the updated mapping function 700 also embodies a relatively lower sensitivity in the updated first sensitivity region 728, a relatively higher sensitivity in the updated second sensitivity region 736, and a relatively lower sensitivity in the updated third sensitivity region 740.

In some examples, the consistent proportionality and topology of the playspaces and sensitivity regions of mapping functions 600 and 700 may be seen by comparing characteristics of the two functions. For example, a metric of the first sensitivity region 628 of mapping function 600 may be directly proportional to an updated metric of the updated first sensitivity region 728 by a constant of proportionality, and a metric of the second sensitivity region 636 may be directly proportional to an updated metric of the updated second sensitivity region 736 by the same constant of proportionality.

For example, where the metric is the width W along the A-axis, the width W of each sensitivity region 728, 736 and 740 in mapping function 700 is directly proportional to the width x of the corresponding sensitivity regions 638, 636 and 640 in mapping function 600 by the same width constant of proportionality $K_w$. The width constant of proportionality $K_w$ may be defined as follows (for simplicity, points P and S are referred to in this example by their A-axis coordinate):

$$K_w = W_n/X_n = 1 - P_{dz}/1 - S_{dz}, \text{ where:}$$

n={1,2,3} corresponding to the 3 sensitivity regions in each mapping function;

$P_{dz}$=A-axis coordinate of dead zone inflection point 602, and $S_{dz}$=A-axis coordinate of updated dead zone inflection point 702.

In the examples of FIGS. 6 and 7, this constant of proportionality $K_w$=1−0.15/1−0.40=1.4. It follows that the width, W1, of first sensitivity region 628 is proportional to the width, X1, of the updated first sensitivity region 728 by: W1/X1=$K_w$=1.4. Similarly, the width, W2, of second sensitivity region 636 is proportional to the width, X2, of the updated second sensitivity region 736 by: W2/X2=$K_w$=1.4. Similarly, the width, W3, of third sensitivity region 640 is proportional to the width, X3, of the updated third sensitivity region 740 by: W3/X3=$K_w$=1.4.

In a similar manner, the slope of each sensitivity region 728, 736 and 740 in mapping function 700 is directly proportional to the slope of the corresponding sensitivity regions 638, 636 and 640 in mapping function 600 by the same slope constant of proportionality K. For example, the slope S1 of first sensitivity region 628 is:

$$S1 = 0.44 - 0.30/0.43 - 0.15 = 0.5.$$

The slope $S1_u$ of updated first sensitivity region 728 is:

$$S1_u = 0.44 - 0.30/0.60 - 0.40 = 0.7.$$

Accordingly the slope constant of proportionality $K_s$ is:

$$K_s = S1/S1_u = 5/7 \approx 0.71$$

In a similar manner, the slope of the second sensitivity region 636 is proportional to the slope of the updated second sensitivity region 736 by the same $K_s \approx 0.71$, and the slope of the third sensitivity region 640 is proportional to the slope of the updated third sensitivity region 740 by the same $K_s \approx 0.71$.

Figure 8A:
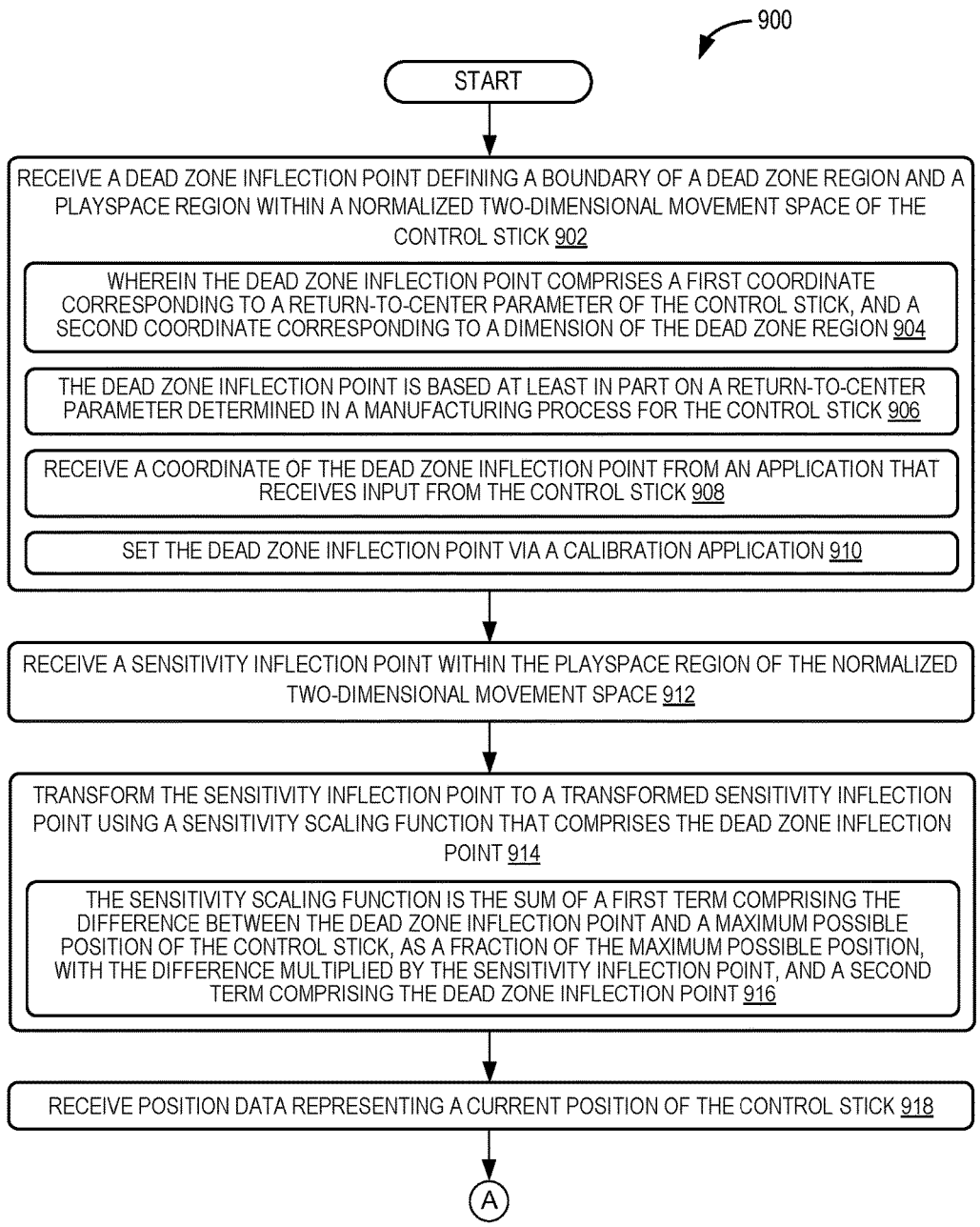
FIGS. 8A, 8B and 8C show a block diagram of a method for adjusting the sensitivity of a control stick according to examples of the present disclosure.
Figure 8B:
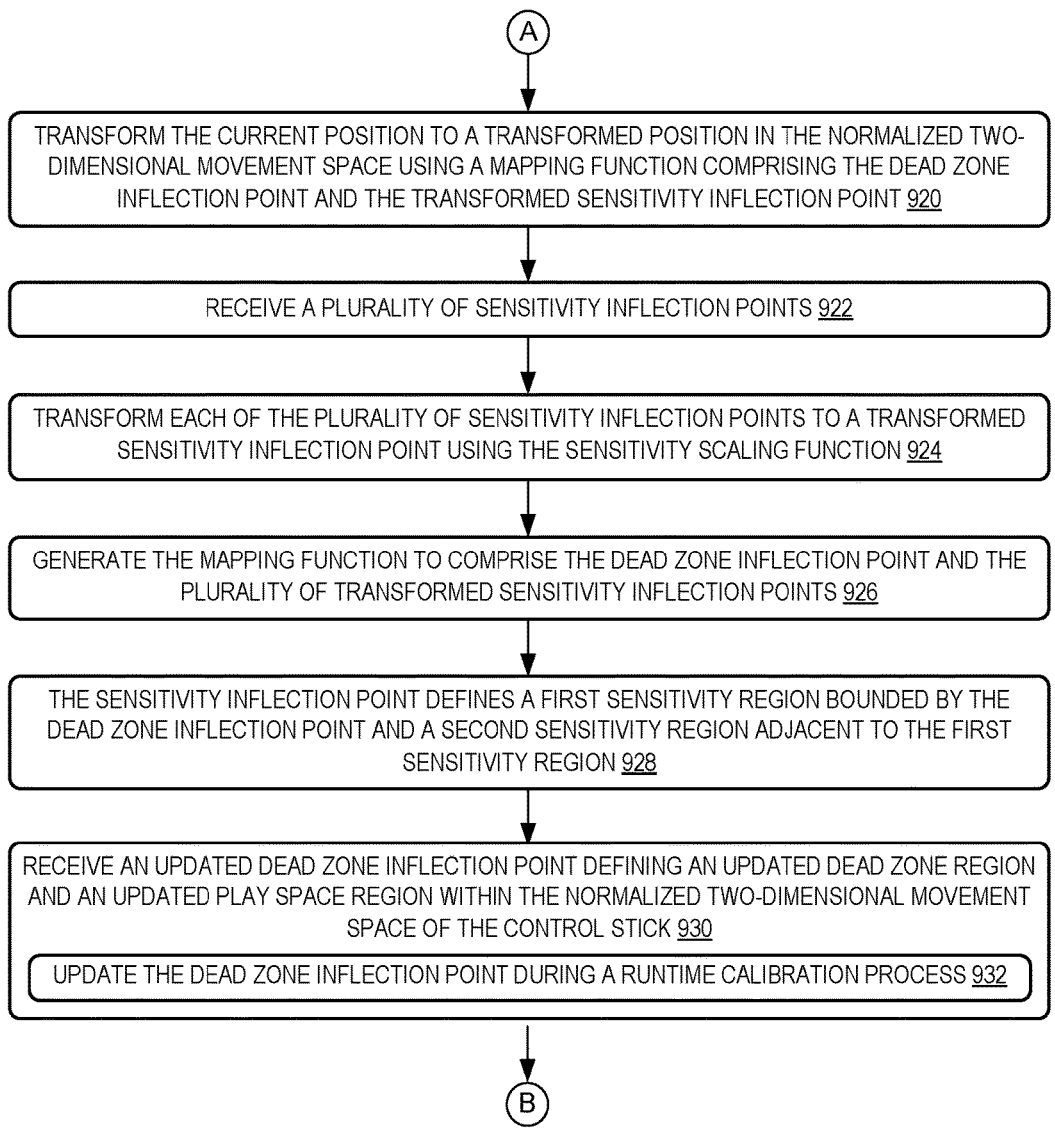
Figure 8C:
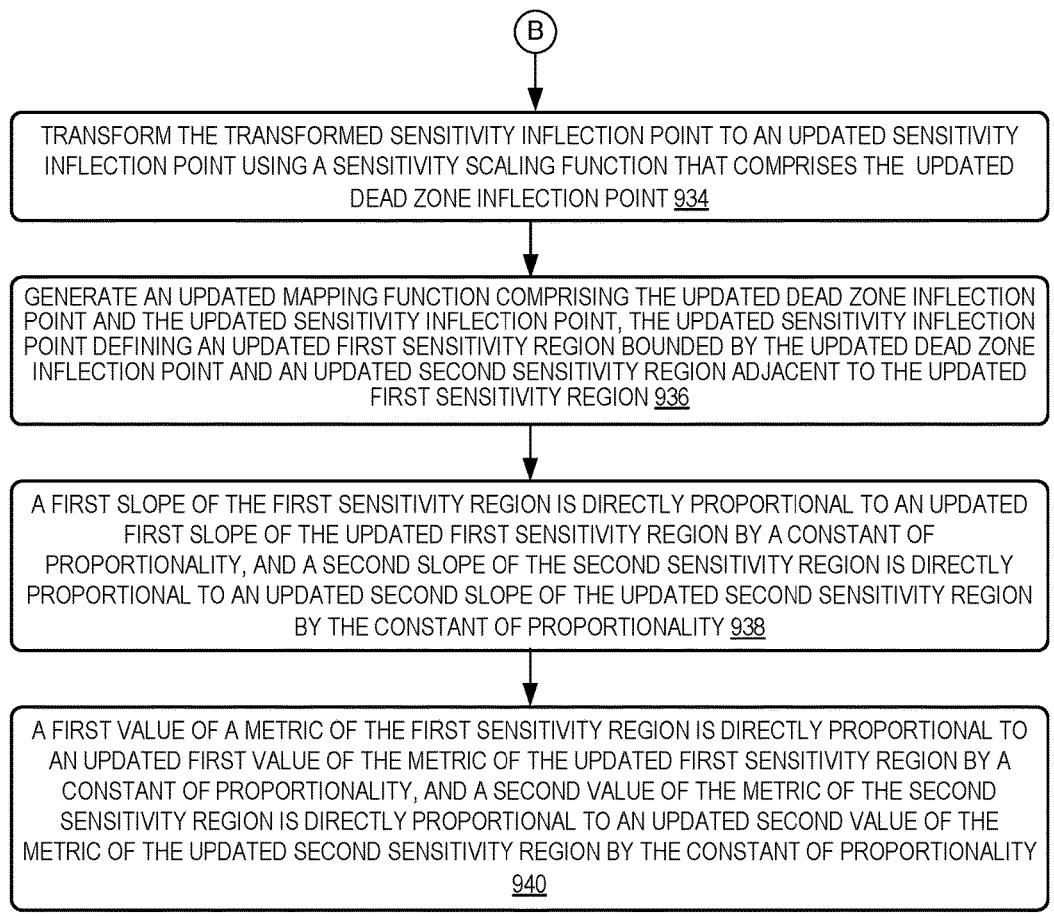

FIGS. 8A-8C illustrate a flow chart of a method 900 for adjusting the sensitivity of a control stick according to examples of the present disclosure. The following description of method 900 is provided with reference to the software and hardware components described above and shown in FIGS. 1-7. It will be appreciated that method 900 also may be performed in other contexts using other suitable hardware and software components.

With reference to FIG. 8A, at 902, the method 900 may include receiving a dead zone inflection point defining a boundary of a dead zone region and a playspace region within a normalized two-dimensional movement space of the control stick. At 904 the method 900 may include the dead zone inflection point comprising a first coordinate corresponding to a return-to-center parameter of the control stick, and a second coordinate corresponding to a dimension of the dead zone region. At 906 the method 900 may include, wherein the dead zone inflection point is based at least in part on a return-to-center parameter determined in a manufacturing process for the control stick. At 908, the method 900 may include receiving a coordinate of the dead zone inflection point from an application that receives input from the control stick. At 910, the method 900 may include setting the dead zone inflection point via a calibration application.

At 912, the method 900 may include receiving a sensitivity inflection point within the playspace region of the normalized two-dimensional movement space. At 914, the method 900 may include transforming the sensitivity inflection point to a transformed sensitivity inflection point using a sensitivity scaling function that comprises the dead zone inflection point. At 916, the method 900 may include wherein the sensitivity scaling function is the sum of a first term comprising the difference between the dead zone inflection point and a maximum possible position of the control stick, as a fraction of the maximum possible position, with the difference multiplied by the sensitivity inflection point; and a second term comprising the dead zone inflection point.

At 918, the method 900 may include receiving position data representing a current position of the control stick. With reference now to FIG. 8B, at 920, the method 900 may include transforming the current position to a transformed position in the normalized two-dimensional movement space using a mapping function comprising the dead zone inflection point and the transformed sensitivity inflection point.

At 922, the method 900 may include receiving a plurality of sensitivity inflection points within the playspace region of the normalized two-dimensional movement space. At 924, the method 900 may include transforming each of the plurality of sensitivity inflection points to a transformed sensitivity inflection point using the sensitivity scaling function. At 926 the method 900 may include generating the mapping function to comprise the dead zone inflection point and the plurality of transformed sensitivity inflection points.

At 928, the method 900 may include wherein the sensitivity inflection point defines a first sensitivity region bounded by the dead zone inflection point and a second sensitivity region adjacent to the first sensitivity region. At 930, the method 900 may include receiving an updated dead zone inflection point defining an updated dead zone region and an updated playspace region within the normalized two-dimensional movement space of the control stick. At 932, the method 900 may include updating the dead zone inflection point during a runtime calibration process.

With reference now to FIG. 8C, at 934, the method 900 may include transforming the transformed sensitivity inflection point to an updated sensitivity inflection point using the sensitivity scaling function that comprises the updated dead zone inflection point. At 936, the method 900 may include generating an updated mapping function comprising the updated dead zone inflection point and the updated sensitivity inflection point, the updated sensitivity inflection point defining an updated first sensitivity region bounded by the updated dead zone inflection point and an updated second sensitivity region adjacent to the updated first sensitivity region.

At 938, the method 900 may include wherein a first slope of the first sensitivity region is directly proportional to an updated first slope of the updated first sensitivity region by a constant of proportionality, and a second slope of the second sensitivity region is directly proportional to an updated second slope of the updated second sensitivity region by the constant of proportionality. At 940, the method 900 may include wherein a first value of a metric of the first sensitivity region is directly proportional to an updated first value of the metric of the updated first sensitivity region by a constant of proportionality, and a second value of the metric of the second sensitivity region is directly proportional to an updated second value of the metric of the updated second sensitivity region by the constant of proportionality.

It will be appreciated that method 900 is provided by way of example and is not meant to be limiting. Therefore, it is to be understood that method 900 may include additional and/or alternative steps relative to those illustrated in FIGS. 8A, 8B and 8C. Further, it is to be understood that method 900 may be performed in any suitable order. Further still, it is to be understood that one or more steps may be omitted from method 900 without departing from the scope of this disclosure In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
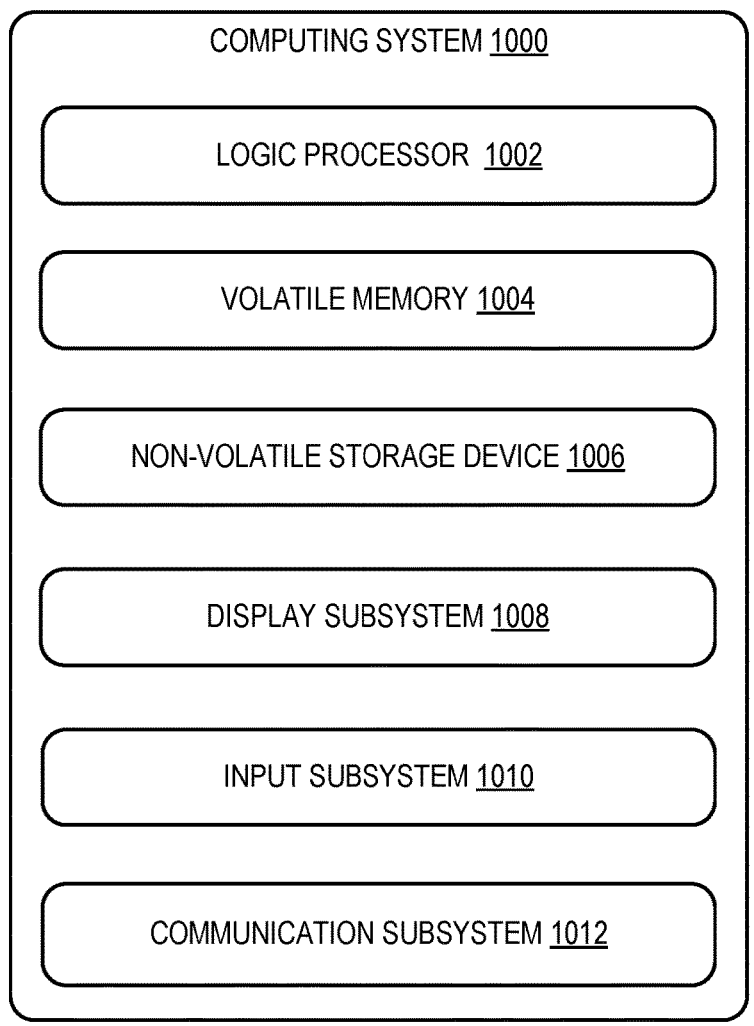
FIG. 9 shows a block diagram of an example computing device according to examples of the present disclosure.

FIG. 9 schematically shows a non-limiting embodiment of a computing system 1000 that can enact one or more of the methods and processes described above. Computing system 1000 is shown in simplified form. Computing system 1000 may take the form of one or more gaming consoles, personal computers, server computers, tablet computers, home-entertainment computers, network computing devices, gaming devices, mobile computing devices, mobile communication devices (e.g., smart phones), and/or other computing devices, and wearable computing devices such as smart wristwatches and head mounted display devices. In the above examples, computing device 10, computing device 40 and content streaming service 30 may comprise computing system 1000 or one or more aspects of computing system 1000.

Computing system 1000 includes a logic processor 1002, volatile memory 1004, and a non-volatile storage device 1006. Computing system 1000 may optionally include a display subsystem 1008, input subsystem 1010, communication subsystem 1012, and/or other components not shown in FIG. 9.

Logic processor 1002 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1002 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1006 includes one or more physical devices configured to hold instructions executable by the logic processors to implement the methods and processes described herein. When such methods and processes are implemented, the state of non-volatile storage device 1006 may be transformed—e.g., to hold different data.

Non-volatile storage device 1006 may include physical devices that are removable and/or built-in. Non-volatile storage device 1006 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1006 may include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Volatile memory 1004 may include physical devices that include random access memory. Volatile memory 1004 is typically utilized by logic processor 1002 to temporarily store information during processing of software instructions. It will be appreciated that volatile memory 1004 typically does not continue to store instructions when power is cut to the volatile memory 1004.

Aspects of logic processor 1002, volatile memory 1004, and non-volatile storage device 1006 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "application" may be used to describe an aspect of computing system 1000 typically implemented in software by a processor to perform a particular function using portions of volatile memory, which function involves transformative processing that specially configures the processor to perform the function. Thus, a program or application may be instantiated via logic processor 1002 executing instructions held by non-volatile storage device 1006, using portions of volatile memory 1004. It will be understood that different programs and/or applications may be instantiated from the same application, service, code block, object, library, routine, API, function, etc. Likewise, the same program and/or application may be instantiated by different applications, services, code blocks, objects, routines, APIs, functions, etc. The terms "program" and "application" may encompass individual or groups of executable files, data files, libraries, drivers, scripts, database records, etc.

When included, display subsystem 1008 may be used to present a visual representation of data held by non-volatile storage device 1006. As the herein described methods and processes change the data held by the non-volatile storage device, and thus transform the state of the non-volatile storage device, the state of display subsystem 1008 may likewise be transformed to visually represent changes in the underlying data. Display subsystem 1008 may include one or more display devices utilizing virtually any type of technology. Such display devices may be combined with logic processor 1002, volatile memory 1004, and/or non-volatile storage device 1006 in a shared enclosure, or such display devices may be peripheral display devices.

When included, input subsystem 1010 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1012 may be configured to communicatively couple various computing devices described herein with each other, and with other devices. Communication subsystem 1012 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1000 to send and/or receive messages to and/or from other devices via a network such as the Internet.

The following paragraphs provide additional support for the claims of the subject application. One aspect provides a method for adjusting the sensitivity of a control stick, the method comprising: receiving a dead zone inflection point defining a boundary of a dead zone region and a playspace region within a normalized two-dimensional movement space of the control stick, receiving a sensitivity inflection point within the playspace region of the normalized two-dimensional movement space, transforming the sensitivity inflection point to a transformed sensitivity inflection point using a sensitivity scaling function that comprises the dead zone inflection point, receiving position data representing a current position of the control stick, and transforming the current position to a transformed position in the normalized two-dimensional movement space using a mapping function comprising the dead zone inflection point and the transformed sensitivity inflection point.

The method may additionally or alternatively include receiving a plurality of sensitivity inflection points within the playspace region of the normalized two-dimensional movement space, transforming each of the plurality of sensitivity inflection points to a transformed sensitivity inflection point using the sensitivity scaling function, and generating the mapping function to comprise the dead zone inflection point and the plurality of transformed sensitivity inflection points.

The method may additionally or alternatively include, wherein the sensitivity scaling function is the sum of a first term comprising the difference between the dead zone inflection point and a maximum possible position of the control stick, as a fraction of the maximum possible position, with the difference multiplied by the sensitivity inflection point, and a second term comprising the dead zone inflection point.

The method may additionally or alternatively include, wherein the sensitivity inflection point defines a first sensitivity region bounded by the dead zone inflection point and a second sensitivity region adjacent to the first sensitivity region, receiving an updated dead zone inflection point defining a boundary of an updated dead zone region and an updated playspace region within the normalized two-dimensional movement space of the control stick, transforming the transformed sensitivity inflection point to an updated sensitivity inflection point using the sensitivity scaling function with the updated dead zone inflection point, and generating an updated mapping function comprising the updated dead zone inflection point and the updated sensitivity inflection point, the updated sensitivity inflection point defining an updated first sensitivity region bounded by the updated dead zone inflection point and an updated second sensitivity region adjacent to the updated first sensitivity region.

The method may additionally or alternatively include, wherein a first slope of the first sensitivity region is directly proportional to an updated first slope of the updated first sensitivity region by a constant of proportionality, and a second slope of the second sensitivity region is directly proportional to an updated second slope of the updated second sensitivity region by the constant of proportionality.

The method may additionally or alternatively include wherein a first value of a metric of the first sensitivity region is directly proportional to an updated first value of the metric of the updated first sensitivity region by a constant of proportionality, and a second value of the metric of the second sensitivity region is directly proportional to an updated second value of the metric of the updated second sensitivity region by the constant of proportionality.

The method may additionally or alternatively include wherein a dead zone inflection point comprises a first coordinate corresponding to a return-to-center parameter of the control stick, and a second coordinate corresponding to a dimension of the dead zone region. The method may additionally or alternatively include wherein the dead zone inflection point is based at least in part on a return-to-center parameter determined in a manufacturing process for the control stick.

The method may additionally or alternatively include receiving a coordinate of the dead zone inflection point from an application that receives input from the control stick. The method may additionally or alternatively include setting the dead zone inflection point via a calibration application. The method may additionally or alternatively include updating the dead zone inflection point during a runtime calibration process.

Another aspect provides a computing device communicatively coupled to a control stick, the computing device comprising a processor and a memory device storing instructions executable by the processor to receive a dead zone inflection point defining a boundary of a dead zone region and a playspace region within a normalized two-dimensional movement space of the control stick, receive a sensitivity inflection point within the playspace region of the normalized two-dimensional movement space, transform the sensitivity inflection point to a transformed sensitivity inflection point using a sensitivity scaling function that comprises the dead zone inflection point, receive position data representing a current position of the control stick, and transform the current position to a transformed position in the normalized two-dimensional movement space using a mapping function comprising the dead zone inflection point and the transformed sensitivity inflection point.

The computing device may additionally or alternatively include instructions executable by the processor to receive a plurality of sensitivity inflection points within the playspace region of the normalized two-dimensional movement space, transform each of the plurality of sensitivity inflection points to a transformed sensitivity inflection point using the sensitivity scaling function, and generate the mapping function to comprise the dead zone inflection point and the plurality of transformed sensitivity inflection points.

The computing device may additionally or alternatively include, wherein the sensitivity inflection point defines a first sensitivity region bounded by the dead zone inflection point and a second sensitivity region adjacent to the first sensitivity region, the instructions executable by the processor to receive an updated dead zone inflection point defining a boundary of an updated dead zone region and an updated playspace region within the normalized two-dimensional movement space of the control stick, transform the transformed sensitivity inflection point to an updated sensitivity inflection point using the sensitivity scaling function, and generate an updated mapping function comprising the updated dead zone inflection point and the updated sensitivity inflection point, the updated sensitivity inflection point defining an updated first sensitivity region bounded by the updated dead zone inflection point and an updated second sensitivity region adjacent to the updated first sensitivity region.

The computing device may additionally or alternatively include, wherein a first slope of the first sensitivity region is directly proportional to an updated first slope of the updated first sensitivity region by a constant of proportionality, and a second slope of the second sensitivity region is directly proportional to an updated second slope of the updated second sensitivity region by the constant of proportionality.

The computing device may additionally or alternatively include, wherein a first value of a metric of the first sensitivity region is directly proportional to an updated first value of the metric of the updated first sensitivity region by a constant of proportionality, and a second value of the metric of the second sensitivity region is directly proportional to an updated second value of the metric of the updated second sensitivity region by the constant of proportionality.

The computing device may additionally or alternatively include, wherein the sensitivity scaling function is the sum of a first term comprising the difference between the dead zone inflection point and a maximum possible position of the control stick, as a fraction of the maximum possible position, with the difference multiplied by the sensitivity inflection point, and a second term comprising the dead zone inflection point.

The computing device may additionally or alternatively include instructions executable by the processor to receive a coordinate of the dead zone inflection point from an application that receives input from the control stick. The computing device may additionally or alternatively include, wherein the dead zone inflection point comprises a first coordinate corresponding to a return-to-center parameter of the control stick, and a second coordinate corresponding to a dimension of the dead zone region.

Another aspect provides a user input device, comprising a control stick configured to receive an input from a user along one or more axes, and a processor configured to receive a dead zone inflection point defining a boundary of a dead zone region and a playspace region within a normalized two-dimensional movement space of the control stick, receive a sensitivity inflection point within the playspace region of the normalized two-dimensional movement space, transform the sensitivity inflection point to a transformed sensitivity inflection point using a sensitivity scaling function that comprises the dead zone inflection point, receive position data representing a current position of the control stick, transform the current position to a transformed position in the normalized two-dimensional movement space using a mapping function comprising the dead zone inflection point and the transformed sensitivity inflection point, and output the transformed position.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing device, a method for adjusting sensitivity of a control stick, the method comprising:
   receiving a dead zone inflection point defining a boundary of a dead zone region and a playspace region within a normalized two-dimensional movement space of the control stick;
   receiving a sensitivity inflection point within the playspace region of the normalized two-dimensional movement space;
   transforming the sensitivity inflection point to a transformed sensitivity inflection point using a sensitivity scaling function that comprises the dead zone inflection point;
   receiving position data representing a current position of the control stick; and
   transforming the current position to a transformed position in the normalized two-dimensional movement space using a mapping function comprising the dead zone inflection point and the transformed sensitivity inflection point.

2. The method of claim 1, further comprising:
   receiving a plurality of sensitivity inflection points within the playspace region of the normalized two-dimensional movement space;
   transforming each of the plurality of sensitivity inflection points to a transformed sensitivity inflection point using the sensitivity scaling function; and
   generating the mapping function to comprise the dead zone inflection point and the plurality of transformed sensitivity inflection points.

3. The method of claim 1, wherein the sensitivity scaling function is the sum of:
   a first term comprising the difference between the dead zone inflection point and a maximum possible position of the control stick, as a fraction of the maximum possible position, with the difference multiplied by the sensitivity inflection point; and a second term comprising the dead zone inflection point.

4. The method of claim 1, wherein the sensitivity inflection point defines a first sensitivity region bounded by the dead zone inflection point and a second sensitivity region adjacent to the first sensitivity region, the method further comprising:
   receiving an updated dead zone inflection point defining a boundary of an updated dead zone region and an updated playspace region within the normalized two-dimensional movement space of the control stick;
   transforming the transformed sensitivity inflection point to an updated sensitivity inflection point using the sensitivity scaling function with the updated dead zone inflection point; and
   generating an updated mapping function comprising the updated dead zone inflection point and the updated sensitivity inflection point, the updated sensitivity inflection point defining an updated first sensitivity region bounded by the updated dead zone inflection point and an updated second sensitivity region adjacent to the updated first sensitivity region.

5. The method of claim 4, wherein a first slope of the first sensitivity region is directly proportional to an updated first slope of the updated first sensitivity region by a constant of proportionality, and a second slope of the second sensitivity region is directly proportional to an updated second slope of the updated second sensitivity region by the constant of proportionality.

6. The method of claim 4, wherein a first value of a metric of the first sensitivity region is directly proportional to an updated first value of the metric of the updated first sensitivity region by a constant of proportionality, and a second value of the metric of the second sensitivity region is directly proportional to an updated second value of the metric of the updated second sensitivity region by the constant of proportionality.

7. The method of claim 1, wherein the dead zone inflection point comprises a first coordinate corresponding to a return-to-center parameter of the control stick, and a second coordinate corresponding to a dimension of the dead zone region.

8. The method of claim 1, wherein the dead zone inflection point is based at least in part on a return-to-center parameter determined in a manufacturing process for the control stick.

9. The method of claim 1, further comprising receiving a coordinate of the dead zone inflection point from an application that receives input from the control stick.

10. The method of claim 1, further comprising setting the dead zone inflection point via a calibration application.

11. The method of claim 1, further comprising updating the dead zone inflection point during a runtime calibration process.

12. A computing device communicatively coupled to a control stick, the computing device comprising:
   a processor, and
   a memory device storing instructions executable by the processor to:
      receive a dead zone inflection point defining a boundary of a dead zone region and a playspace region within a normalized two-dimensional movement space of the control stick;
      receive a sensitivity inflection point within the playspace region of the normalized two-dimensional movement space;
      transform the sensitivity inflection point to a transformed sensitivity inflection point using a sensitivity scaling function that comprises the dead zone inflection point;
      receive position data representing a current position of the control stick; and
      transform the current position to a transformed position in the normalized two-dimensional movement space using a mapping function comprising the dead zone inflection point and the transformed sensitivity inflection point.

13. The computing device of claim 12, wherein the instructions are executable to:
   receive a plurality of sensitivity inflection points within the playspace region of the normalized two-dimensional movement sp ace;
   transform each of the plurality of sensitivity inflection points to a transformed sensitivity inflection point using the sensitivity scaling function; and
   generate the mapping function to comprise the dead zone inflection point and the plurality of transformed sensitivity inflection points.

14. The computing device of claim 12, wherein the sensitivity inflection point defines a first sensitivity region bounded by the dead zone inflection point and a second sensitivity region adjacent to the first sensitivity region, and the instructions are executable to:
   receive an updated dead zone inflection point defining a boundary of an updated dead zone region and an updated playspace region within the normalized two-dimensional movement space of the control stick;
   transform the transformed sensitivity inflection point to an updated sensitivity inflection point using the sensitivity scaling function; and
   generate an updated mapping function comprising the updated dead zone inflection point and the updated sensitivity inflection point, the updated sensitivity inflection point defining an updated first sensitivity region bounded by the updated dead zone inflection point and an updated second sensitivity region adjacent to the updated first sensitivity region.

15. The computing device of claim 14, wherein a first slope of the first sensitivity region is directly proportional to an updated first slope of the updated first sensitivity region by a constant of proportionality, and a second slope of the second sensitivity region is directly proportional to an updated second slope of the updated second sensitivity region by the constant of proportionality.

16. The computing device of claim 14, wherein a first value of a metric of the first sensitivity region is directly proportional to an updated first value of the metric of the updated first sensitivity region by a constant of proportionality, and a second value of the metric of the second sensitivity region is directly proportional to an updated second value of the metric of the updated second sensitivity region by the constant of proportionality.

17. The computing device of claim 12, wherein the sensitivity scaling function is the sum of:
   a first term comprising the difference between the dead zone inflection point and a maximum possible position of the control stick, as a fraction of the maximum possible position, with the difference multiplied by the sensitivity inflection point; and
   a second term comprising the dead zone inflection point.

18. The computing device of claim 12, wherein the instructions are executable to:

receive a coordinate of the dead zone inflection point from an application that receives input from the control stick.

19. The computing device of claim 12, wherein the dead zone inflection point comprises a first coordinate corresponding to a return-to-center parameter of the control stick, and a second coordinate corresponding to a dimension of the dead zone region.

20. A user input device, comprising:
a control stick configured to receive an input from a user along one or more axes; and
a processor configured to:
receive a dead zone inflection point defining a boundary of a dead zone region and a playspace region within a normalized two-dimensional movement space of the control stick;
receive a sensitivity inflection point within the playspace region of the normalized two-dimensional movement space;
transform the sensitivity inflection point to a transformed sensitivity inflection point using a sensitivity scaling function that comprises the dead zone inflection point;
receive position data representing a current position of the control stick;
transform the current position to a transformed position in the normalized two-dimensional movement space using a mapping function comprising the dead zone inflection point and the transformed sensitivity inflection point; and
output the transformed position.

* * * * *